Feb. 20, 1962  LE ROY D. GORE ETAL  3,021,685
METHOD AND APPARATUS FOR VENDING PREMIX
TYPE CARBONATED BEVERAGES
Filed Jan. 28, 1959  5 Sheets-Sheet 1

INVENTORS.
LeRoy D. Gore
William M. Barnes
BY
ATTORNEY.

Fig. 3.

Feb. 20, 1962 LE ROY D. GORE ETAL 3,021,685
METHOD AND APPARATUS FOR VENDING PREMIX
TYPE CARBONATED BEVERAGES
Filed Jan. 28, 1959 5 Sheets-Sheet 3

INVENTORS.
LeRoy D. Gore
William M. Barnes
BY
ATTORNEY.

Feb. 20, 1962 LE ROY D. GORE ETAL 3,021,685
METHOD AND APPARATUS FOR VENDING PREMIX
TYPE CARBONATED BEVERAGES
Filed Jan. 28, 1959 5 Sheets-Sheet 4

INVENTORS.
LeRoy D. Gore
William M. Barnes
BY
ATTORNEY.

INVENTORS.
LeRoy D. Gore
William M. Barnes
BY

ATTORNEY.

United States Patent Office 3,021,685
Patented Feb. 20, 1962

3,021,685
METHOD AND APPARATUS FOR VENDING PREMIX TYPE CARBONATED BEVERAGES
Le Roy D. Gore, Independence, Mo., and William M. Barnes, Atlanta, Ga., assignors of one-half to The Vendo Company, Kansas City, Mo., a corporation of Missouri, and one-half to The Coca-Cola Company, Atlanta, Ga., a corporation of Delaware
Filed Jan. 28, 1959, Ser. No. 789,707
4 Claims. (Cl. 62—89)

This invention relates to an improved system for the keeping and dispensing of carbonated beverages, particularly those of the soft drink variety which are commonly dispensed from suitable facilities in public places, industrial plants, offices and the like. The improved system contemplates the provision of both a novel method and novel apparatus especially adapted for employment in connection with coin operated, commercial beverage vending equipment, although neither the method nor the apparatus improvements are necessarily so limited in applicability.

The purposes and significance of the improvements contemplated by this invention will be more clear when considered in the light of a brief résumé of the steps heretofore taken in the art and which have led to the state of the latter prevailing immediately prior to the instant invention. For many years the only known practical and popular method of vending soft drinks was by means of apparatus adapted to store and dispense beverages packaged in bottles or other suitable containers from which same were consumed by the customer after vending to him of the beverage containing package. The cost and inconvenience of providing and handling bottles or the like then led to attempts to develop apparatus into which the various ingredients required for preparing a beverage could be introduced in bulk quantity with such apparatus being adapted to intermix such ingredients to form the beverage preparatory to dispensing the same. Such latter system and apparatus suffered a number of disadvantages, among which may be noted the general lack of uniformity in the beverage products prepared and dispensed by such apparatus, the expense and inconvenience of handling and servicing the apparatus with a number of separate ingredient materials, the difficulty of providing means for properly storing or handling certain of the required types of ingredient materials, and the like. Such attempts at providing systems and means for the vending of beverages in bulk did, however, result in the development of satisfactory means for storing and individually releasing paper cups or the like adapted to receive the soft drinks to be vended.

More recently, it has been found that many of the disadvantages of the individual ingredient mixing systems can be eliminated by furnishing to the vending apparatus an aqueous, premixed, properly carbonated liquid containing in solution all of the ingredients of the final beverage, which liquid is normally delivered to the apparatus in suitable tanks, and a supply of carbon dioxide gas enclosed within a metallic tank and under suitable pressure for serving as a dispensing propellant. Systems utilizing the last-mentioned principle are commonly known in the art and the trade as "premix systems," in recognition of the premixed condition of the liquid. Up until the advent of the instant invention, it has been the customary and, insofar as is known, universal practice for the product tanks containing the beverage liquid and the gas tanks to be delivered into and maintained in the vending apparatus at substantially ambient temperatures far in excess of those suitable for final vending of the beverage product. Such system has, therefore, always necessarily included a step in which the beverage liquid has had to be abruptly lowered in temperature or "flash cooled" before dispensing. Such flash cooling step of conventional premix systems has inevitably involved the provision of some special type of rapid heat exchanging mechanism, the most common of which has involved the provision of an elongated coiled beverage carrying tube maintained in heat exchanging relationship with an elongated, coiled refrigerant carrying tube by a suitable heat exchanging medium of either metallic or liquid nature.

It will be worthwhile to consider in passing at least some of the disadvantages inherent in premix methods and apparatus involving a flash cooling step or mechanism suitable for performing such step. In general, it may be noted that the carbonation level of the product, the cost of providing the initially required apparatus, the quantity of propellant gas needed, the sanitational attributes and the amount of time required for proper servicing are all affected adversely and significantly by inclusion of the flash cooling step and mechanism, as well as other steps and mechanisms required in conjunction therewith if the beverage product being dispensed is to be maintained within permissible carbonation and delivered volume tolerances. For specific illustrations one may note first, the substantial cost of the flash cooling mechanism itself, as well as the difficulties and time involved in attempting to maintain the same in sanitary and operable condition, which are well known to servicemen familiar with such systems.

Still more basic, however, are certain considerations growing out of the inherent nature of the materials being handled and the carbonation maintaining, cooling and pressure dispensing functions to be accomplished. The amount of any gas dissolved in a fluid with which it is in contact is, of course, controlled in accordance with Dalton's laws of partial pressure from which it is established that the amount of gas dissolved in the fluid will depend upon the partial pressure of that portion of the gas in contact with the fluid and in the head space overlying the fluid. It is moreover, evident that the partial pressure of such head space gas in contact with the fluid is a function of the temperature of the gas and liquid. In the case of a beverage liquid under carbon dioxide gas pressure, the proportion of carbon dioxide gas dissolved or absorbed into the liquid at constant pressure will decrease as the temperature of the liquid is raised and will increase as the temperature of the liquid is lowered. Similarly, if the liquid is held at constant temperature, the carbonation (i.e. the proportion of volumes of carbon dioxide gas in solution to the volumes of liquid), will increase with an increase in pressure and decrease with a decrease in pressure.

As will be clear to those skilled in this art, the carbonation of a beverage is normally directed to accomplishing a certain optimum level of carbonation in terms of volumes of gas dissolved in the beverage product, the quality of the final product being significantly deteriorated by any substantial deviation from such optimum proportion. Since the optimum level of carbonation may vary somewhat with the particular type of beverage involved, it will be sufficient to cite as an example that the proportion of 3.6 volumes of dissolved carbon dioxide gas in each similar volume of the liquid portion of a well known carbonated beverage widely vended by the premix system, is considered optimum for that product.

Assume now that in a conventional flash cooling type premix system the beverage liquid within the product tanks are delivered to the system at some given ambient temperature and that the pressure of the carbon dioxide gas applied in pressurized communication with such liquid is initially adjusted to a pressure level which will maintain essentially the optimum level of carbonation. If the temperature of such liquid rises (as is common where product tanks are delivered from a service truck to an indoor location), the beverage will become undercarbonated during dispensing, whereas, if the temperature of the liquid falls (as is most common and occurs in the case of certain outdoor vending machine installations and the like), the beverage product will become severely overcarbonated. As pointed out above, the maintenance of substantially the optimum level of carbonation is essential to maintenance of the quality of the vended product. Accordingly, with conventional flash cooling type premix systems, it is apparent that nothing short of continued adjustment of the pressure of the carbon dioxide gas in contacting relationship with the beverage liquid in accordance with variations in the temperature of the latter, can result in consistent dispensing of a uniform, high quality product. Such regulation by manual means would be completely impractical even if sufficient qualified personnel were available for continuous duty with each machine, and attempts to accomplish such regulation by mechanical means have also proved unduly expensive, unreliable and unsatisfactory.

It will also be evident to those skilled in the art, however, that the above-mentioned adverse effect upon the quality of the vended product itself is by no means the limit of the disadvantages which accrue from improper relationships between or control over the temperatures, pressures and levels of carbonation inherently involved in the premix beverage vending process. In commercial equipment employing the premix vending process for dispensing beverages into cups, the beverage product is vended under the influence of a carbon dioxide gas pressure imposed on the liquid, with the amount of beverage vended during each dispensing operation normally being controlled by the interval of time during which the dispensing valve, incorporated in or associated with the delivery spigot, is opened. Such dispensing valves are customarily operated by electrical solenoids controlled by an electric timer and, when opened, present what may be considered as an orifice of fixed size. Since the amount of fluid which will be dispensed through a fixed orifice during any given period of time depends upon and is a function of the pressure of such fluid, it will be clear that, even if the pressure of the carbon dioxide gas could be continuously regulated in an attempt to maintain an optimum level of carbonation, the amount of beverage dispensed during each vending operation would tend to vary widely with changes in the gas pressure then prevailing. Moreover, even if no attempt is made to maintain the pressure of the gas at a level for optimum carbonation (which is the usual case in practice), it will be seen that the pressure of such gas may vary significantly as the temperatures of the liquid and gas change in response to ambient or other conditions, again resulting in variations and inconsistency of the amount of beverage dispensed during successive operations of a flash cooling type system.

Attempts were made to overcome the last-mentioned problem by the use of a liquid pressure regulator in the product line adjacent the input to the dispensing valve. Such attempted solution, however, did not prove wholly satisfactory since the pressure regulator structure was responsive only to pressure parameters and did not compensate for changes in viscosity, which commonly occur in significant amounts in premix beverage liquids, particularly with changes in temperature thereof. Such changes of viscosity were found to result in variations in the amount of beverage dispensed which were beyond permissible limits therefor. The next attempt in the art to solve such problem was to provide a flow control device in series with the product line which would be responsive to the inertia of the product moving through the line, which parameter is, of course, affected by both pressure and viscosity. Such approach will, with properly designed equipment, often provide quite satisfactory results. However, such flow controls are both expensive to manufacture to the tolerances required for proper functioning in the application under consideration and are inconvenient and difficult to clean and maintain in condition complying with the strict sanitary codes which must be met in connection with beverage vending equipment.

From the commercial point of view, even if the lack of product quality control and the lack of consistency in the amount of product vended could be overlooked, the drawbacks of conventional flash cooling type premix systems connected with the problem of servicing of equipment to conform with sanitary regulations are imposing, and have probably tended to retard, the popularity of premix systems behind that which would have been expected in view of the natural attractions of the premix concept generally as compared with bottle vending. As those familiar with this art and trade know, the water or eutectic bath commonly incorporated in flash coolers as a heat exchanging medium, the long product carrying coil portion of the flash cooler, the pressure or flow regulators normally required in flash cooling systems, and the spillage likely to result from inconsistencies in volume of product vended or excessive foaming due to improper carbonation, each present particularly annoying and time consuming, on-location, servicing and sanitizing problems.

Accordingly, it is the primary object of this invention to provide an improved premix dispensing or vending system, method and apparatus in which the flash cooling step and mechanism, as well as auxiliary structure normally required in conjunction with the latter, has been eliminated and all of the above-mentioned and other problems inherent in flash cooling type premix vending systems overcome.

Another important object of this invention is to provide a premix beverage dispensing system in which at least the beverage is, prior to bringing the carbon dioxide propellant gas into communication therewith, precooled to a temperature within a predetermined temperature range suitable for maintaining the initial carbonation thereof until the same is finally vended.

Another important object of this invention is to provide a premix type system for keeping and dispensing of carbonated soft drinks in which the pressures and temperatures of the carbon dioxide gas and the beverage liquid are both controlled at substantially constant, predetermined levels from the time that such gas is initially placed in communication with such liquid until the beverage product is dispensed.

Another important object of the invention is to provide apparatus by which a plurality of product tanks containing beverage liquid may be simultaneously accommodated with certain of same being subjected to precooling while others, which have been previously precooled, are being maintained in proper state of carbonation, pressure and temperature for fulfilling the demand for drinks to be dispensed therefrom, a particular feature of this invention being the manner in which artificially produced and cooled currents of air are circulated through paths adjacent the various product tanks to provide the proper heat exchanging relationships by which certain of the tanks may be precooled from ambient temperature while others are being maintained at precooled temperature.

Other important objects of the invention include the provision of improved premix dispensing methods and apparatus characterized by the comparative simplicity of same as compared with previously existing methods and apparatus, substantial reductions in the cost of both initial manufacture and continued servicing, and a significant increase in quality of the dispensed beverage product and the consistency with which the latter may be reliably dispensed with existing and economical means.

Still other important objects of the invention, including various details of the improved method and apparatus, will be made clear or become apparent from the accompanying drawings and the description of the invention which follows.

Referring first to the novel and improved method of keeping and dispensing carbonated soft drink beverages, contemplated by the invention, it is the essence in eliminating the need for a flash cooling step that the beverage liquid component be precooled to a predetermined range of temperatures prior to placing the carbon dioxide propellant gas in pressurized communication therewith. Although such temperature range, which is chosen both for its suitability to vending of the beverage product at such temperature and for its suitability in maintaining proper carbonation, may vary somewhat with different products, the range from just above the freezing temperature of the beverage liquid up to a temperature of about 40° F. has been found to be quite satisfactory for all presently known forms of carbonated soft drink beverages now customarily dispensed in premix type systems. As a further example, it has been found that temperatures of one highly carbonated beverage are best chosen at a level not more than about 36° F., if optimum product carbonation is to be maintained. Although small or occasional excursions above such temperature range will result mainly only in a corresponding loss of carbonation, adversely affecting the taste of the product, and dispensed volume consistency, any substantial or lasting deviations from such range are found to materially affect the advantageous performance which may be expected with this invention when the preferred range of temperatures is maintained.

Although not necessarily required in order to enjoy certain advantages of the method aspects of the invention, it has been found convenient to accomplish the precooling step mentioned by the circulation of refrigerated artificial currents of air in heat exchanging relationship with a tank containing the beverage liquid, as will hereinafter be more fully explained.

When the invention is practiced with one of the preferred forms of apparatus to be later discussed, it will be noted that the carbon dioxide gas within its tank, a given supply of which gas will normally last through more than one set of product tanks accommodated by the machine, also enjoys subjection to a cooling step, which adds to the overall stability of the system. It will be understood that initial steps of the method preferably include the enclosing of the carbon dioxide gas and the beverage liquid in respective containers therefor, which should be of a thermally conductive material such as metal.

Following the precooling of the beverage liquid, as mentioned above, the next step is for the carbon dioxide gas to be placed in direct pressurized communication with the beverage liquid at a pressure within a predetermined pressure range at the zone of mutual contact between such gas and such liquid.

In practice, the carbon dioxide gas is normally maintained in its storage tank in a liquid state and at a high pressure considerably in excess of that which will be required in the system. Therefore, a suitable pressure regulating valve is provided in the line leading from the carbon dioxide tank to the (or the first of the) product tanks containing the beverage liquid material for pressure reducing purposes. Sufficient space above the beverage liquid within its enclosure is preferably left for receiving a head of the carbon dioxide gas thereabove in pressurized contact therewith.

Although the pressure of the head of carbon dioxide gas in contact with the beverage liquid may vary somewhat in accordance with the specific gravity of the particular liquid and the level of carbonation desired in the particular end product to be dispensed, it has been found that a range of head pressures from about 18 pounds per square inch gauge to about 24 pounds per square inch gauge is to be preferred for producing optimum levels of carbonation with all presently known types of carbonated soft drink beverages commonly dispensed from premix systems when the temperature of the beverage liquid is maintained within the critical temperature range mentioned above; it has been further found that pressures down to about 12 pounds per square inch gauge or up to about 30 pounds per square gauge will still deliver an acceptable product. Obviously, the identity of particular products being handled or the choice of particular temperatures and levels of desired carbonation will lead to optimizing adjustment of the gas contact pressure within the range mentioned.

After placing the pressurizing carbon dioxide gas in contacting communication with the beverage, the next step is to maintain the mentioned temperature and pressure within said ranges, so as to preserve the properly carbonated state of the beverage liquid, until same is dispensed upon customer demand therefor.

The dispensing step is carried out by simply placing the enclosed, properly carbonated, cooled, beverage liquid in communication with the atmosphere, whereupon a quantity thereof will be discharged at the desired temperature and carbonation, by virtue of the pressure head of gas pressing upon such liquid. Such dispensing is, of course, normally accomplished by the opening of a faucet valve adapted to direct the beverage through the atmosphere into a paper cup or the like from which the same will be consumed.

Since the pressure head of gas utilized to provide the dispensing pressure is held substantially constant in the method of this invention, it will be clear that the dispensing step may be further characterized by controlling the interval of dispensing during which the beverage liquid is placed in communication with the atmosphere, in order to determine the volume of beverage which will be discharged.

By way of comparison with the method of this invention, it should be pointed out that the line resistance presented by the flash cooler product coil in a conventional flash cooling type premix system, normally requires a minimum gas head pressure in excess of 50 pounds per square inch gauge, with such pressures in conventional systems ranging even much higher where the ambient temperature of the beverage liquid introduced into the system is relatively high. In addition to the other advantages of the present method, it may, therefore, be significantly pointed out that by permitting the use of substantially reduced carbon dioxide pressures for propelling purposes, the consumption of carbon dioxide is substantially reduced with consequent savings in operating costs.

Further aspects and considerations relative to the method contemplated by this invention will become evident from the description of certain preferred forms of apparatus for performing same that follows. Before proceeding to a detailed description of such forms of apparatus, however, it will be well to point out that the preferred forms of apparatus contemplate simultaneously precooling certain beverage liquid containing tanks while maintaining the temperature of other previously cooled liquid containing tanks substantially constant, all within the same vending machine housing. This requirement is imposed from the commercial viewpoint by the inconvenience of precooling tanks at a remote location and then maintaining the same in properly cooled condition during transportation to and installation in a particular vending machine. In accomplishing such precooling of certain tanks and the maintenance of other tanks in their previously cooled condition, a careful balance in the use of available cooling capacity is necessary to prevent warm-up of previously cooled tanks when new tanks are introduced at ambient temperatures for purposes of precooling the same. It is this problem which comprises one of the primary obstacles overcome by the improved forms of apparatus contemplated by this invention and of which illustrative embodiments are hereinafter disclosed.

Figures 1, 2, 4:
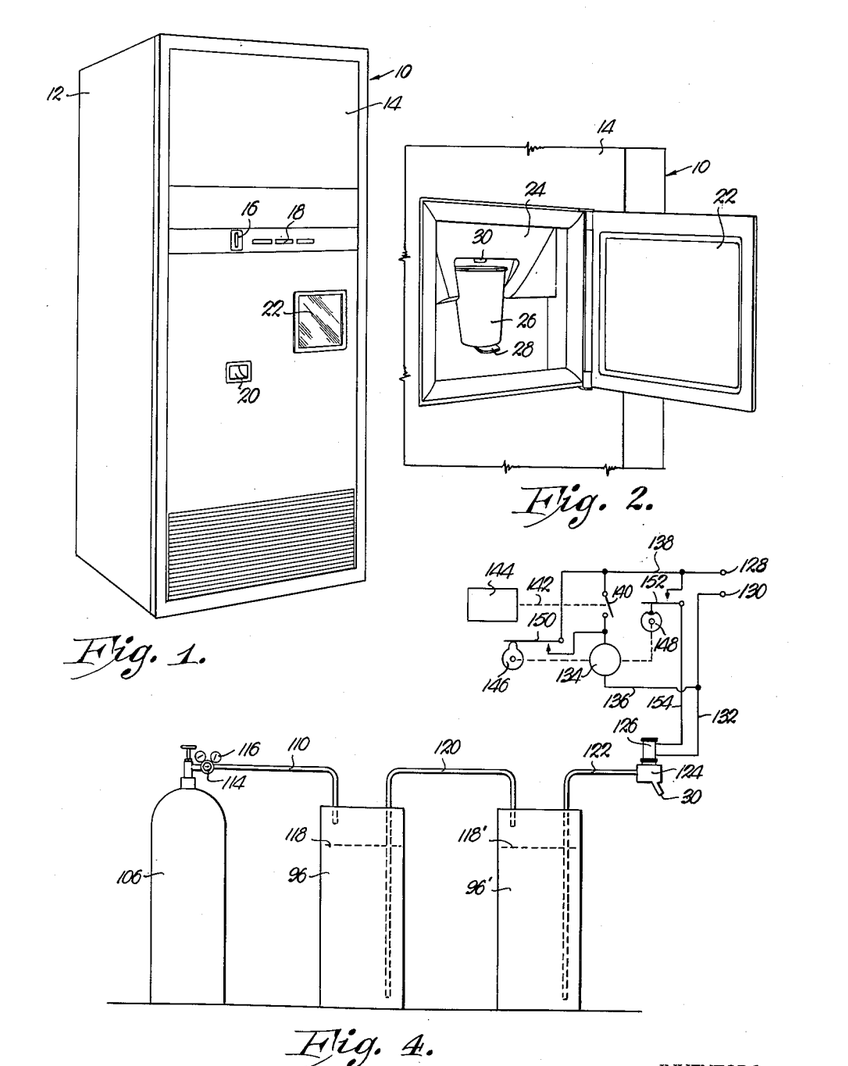
FIG. 1 is a perspective view of the exterior of the front and one side of an illustrative embodiment of premix vending machine suitable for incorporating the principles of this invention.
FIG. 2 is a fragmentary perspective view of a portion of the front of the machine illustrated in FIG. 1, showing the product access door of such machine in open condition.
FIG. 4 is a schematic representation of an illustrative embodiment of a gas, beverage liquid, and product liquid circuit embodying the principles of this invention and illustrating all of the principal components and connections required for completion thereof, as well as a portion of the electrical and mechanical means which may be associated with the dispensing valve for controlling the operation of the latter.

Referring now to FIG. 1, the numeral 10 generally indicates a premix type, carbonated drink dispensing, vending machine suitable for use in practicing the method contemplated by this invention and which may embody the apparatus improvements to be described. Such vending machine 10, unconventionally for a premix type machine, includes a thermally insulated outer housing 12 having a thermally insulated door 14 hingedly mounted thereon for access to the interior of the machine 10. The machine 10 may include on the front panel of door 14 a coin receiving slot 16, a number of product selection buttons 18, a coin return opening 20 and a product access opening normally closed by a hingedly mounted door 22.

Referring next to FIG. 2, in which the door 22 is shown in open position, it will be seen that the door 14 carries a cup dispensing mechanism 24 of any conventional character adapted to successively discharge individual paper cups or the like 26 onto a vending platform as at 28 for discharge thereinto of the beverage to be dispensed from a spigot as at 30.

Figure 3:
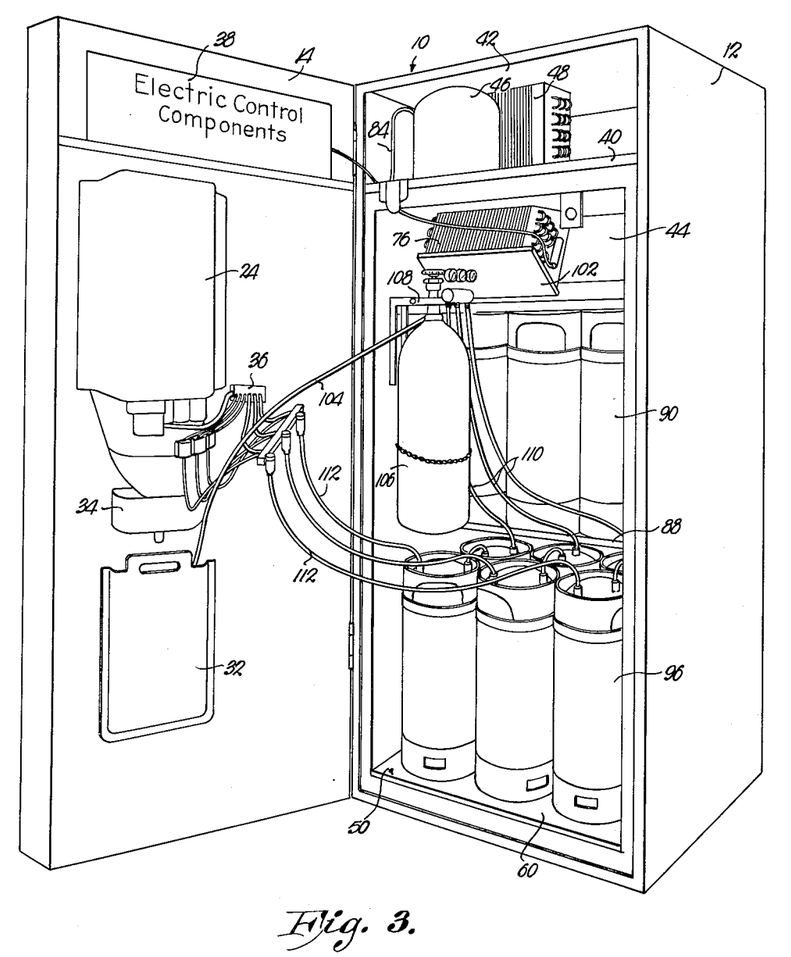
FIG. 3 is a perspective view of the machine illustrated in FIG. 1, taken from the front and opposite side thereof with the front door of the machine open to reveal the location of certain principal components of the apparatus.
Figure 5:
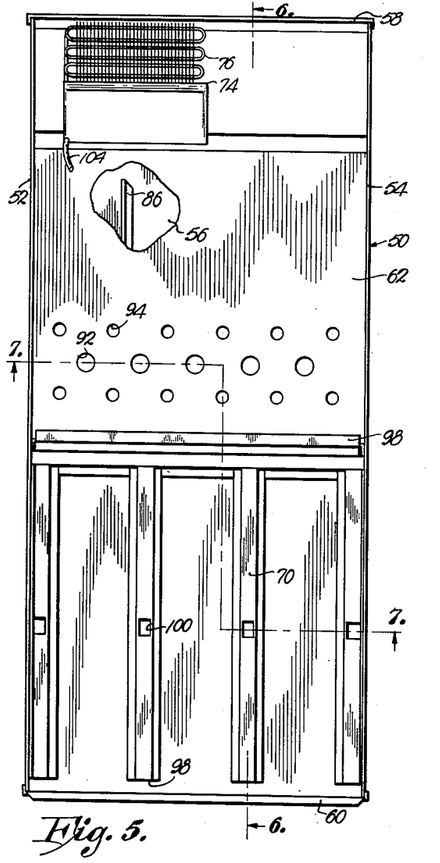
FIG. 5 is a front elevational view of an interior frame and duct assembly adapted to be accommodated within the outer housing of the machine illustrated in FIG. 1.
Figure 6:
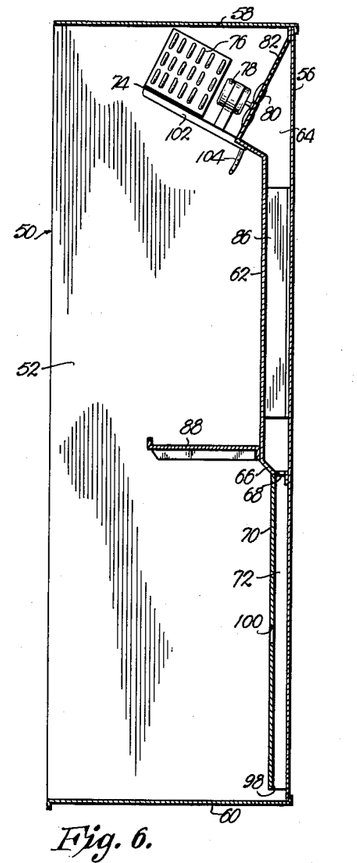
FIG. 6 is a cross-sectional view taken on line 6—6 of FIG. 5.
Figure 7:
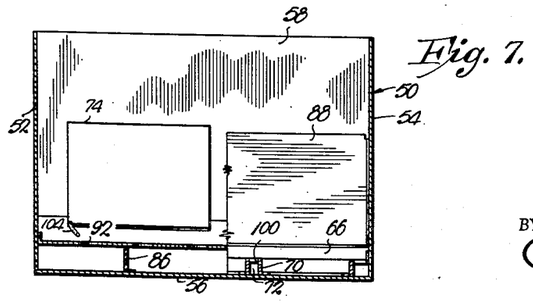
FIG. 7 is a cross-sectional view taken on line 7—7 of FIG. 5.

Referring to FIG. 3, it will be seen that the cup dispensing mechanism 24 is carried directly on door 14, as may also be a waste tank 32, structure as at 34 for defining and enclosing from the rear the dispensing station or platform 28, tie means as at 36 for supporting certain of the liquid carrying lines hereinafter to be described, and a box 38 containing various electrical control components associated with the coin responsive mechanism of the machine 10, the details of which form no part of the present invention and may be of any conventional character. The insulated housing 12 is provided with an insulated shelf-like partition 40 dividing the interior of the machine 10 into an upper compartment 42 and a lower compartment 44. Components of a conventional refrigerating system such as a motor compressor assembly 46, a condenser 48 and the like may be housed within the upper compartment 42 and suitably vented to the atmosphere through the rear of the housing 12. The lower compartment 44 is adapted to receive a frame, shelf and duct-providing assembly generally designated 50, which is shown in FIGS. 5 through 7 inclusive as well as FIG. 3. It will be understood by those skilled in the art that, although the assembly 50 is conveniently fabricated separately and then slipped into place within the lower compartment 44 of the machine 10, the operative parts of the assembly 50 could be built into the housing 12 as a part thereof if desired.

The assembly 50 includes side plates 52 and 54, a rear wall 56, a top plate 58 and a bottom plate 60. A partition 62 is mounted in the upper part of the assembly 50 in forwardly spaced relation to the rear wall 36 of the latter to present a main air duct 64 extending laterally across the assembly 50 and about halfway down the height of the latter. The bottom of the duct 64 is closed by a plate 66 having therein however a plurality of openings 68 each communicating with the top of an upright elongated channel member 70, each of the latter defining a further auxiliary duct 72. Mounted on an inclined supporting shelf or bracket 74 are a refrigeration evaporator 76, an electric fan operating motor 78 and a fan 80 operably coupled with the motor 78 and disposed within an accommodating aperture therefor in an upper portion 82 of the partition 62. The evaporator 74 is conventionally coupled by lines as at 84 (FIG. 3) with the compressor and condenser components 46 and 48 of the refrigerating system. The evaporator 76 is preferably conventionally formed of coiled tubing to permit currents of air to be drawn therethrough by the fan 80 when the latter is operating so that such currents of air will be cooled. Electrical connections are of course provided for the motor 78 for operating the same to circulate cooled currents of air within the assembly 50 in the manner hereinafter described.

In the illustrated embodiment an upright, forwardly extending partition 86 is shown within the duct 64 extending from the rear wall 56 forwardly to the partition 62, the purpose of such partition 86 being to effect a more even distribution of the cooled air currents being discharged into the duct 64 by the fan 80, since the latter was disposed closer to one side of the assembly 50 than the other for convenience in providing clearance for other parts of the machine 10 mounted on the door 14. Even where the fan 80 is located centrally of the assembly 50, such a partition 86 can be helpful in providing suitable air distribution, but is not absolutely essential.

Mounted upon the partition 62 and extending forwardly therefrom is a shelf 88 adapted, in this particular embodiment, for receiving and supporting thereon product tanks to be precooled. A number of such product tanks are shown as at 90 in FIG. 3 upon the shelf 88. The partition 62 is provided with a pattern of openings 92 and 94 therein, which openings 92 and 94 are spaced above the shelf 88 but preferably are closer to the latter than to the uppermost extremities of tanks 90 resting upon the shelf 88. The number and cross-sectional area of such openings 92 and 94 will be relatively large as compared with the air outlet openings hereinafter to be described associated with the zone of assembly 50 below the shelf 88, since the tanks 90 being precooled will require a larger degree of circulation of cooled air thereabout for precooling than will product tanks 96, which are emplaced upon the bottom wall 60 of the assembly 50 after precooling thereof when they are to be coupled into the dispensing circuit.

In the illustrated embodiment, four of the channels 70 presenting auxiliary ducts 72 were found sufficient for maintaining the previously precooled product tanks 96 at the desired temperature when each of such channels was open at its bottom as at 98 and provided with an intermediate, forwardly facing opening 100 about midway of its height. In the preferred embodiment, it was found that the cross-sectional area of the openings 92 and 94 should be so proportioned to the cross-section of the openings 98 and 100 that approximately eighty percent of the cooled air currents would be discharged from the openings 92 and 94 and approximately twenty percent of such air currents discharged from the openings 98 and 100. Obviously, the exact shape or arrangement of the air outlet openings 92, 94, 98 and 100 may be altered in accordance with the number and configuration of tanks 90 and 96 to be handled in the machine 10; the illustrated arrangement has been found satisfactory, however, with tanks 90 and 96 of normal configuration arranged in the manner illustrated to utilize the maximum storage capacity available within the assembly 50.

Before leaving FIG. 6, it may be pointed out that a drip pan 102 may be provided beneath the evaporator 76 for gathering condensation therefrom, and that such drip pan 102 may be coupled by a flexible tube 104 with the waste tank 32.

Returning now to FIG. 3, a tank 106 of carbon dioxide gas under pressure is suitably suspended within the assembly 50 by bracket means as at 108. Gas and liquid lines, which may consist of flexible tubing, are illustrated as at 110 and 112 and may be employed to interconnect the carbon dioxide gas tank 106 with one or more of the product tanks 96 and the latter with the dispensing spigot 30 as more fully described hereinafter in connection with FIG. 4. It may be noted, however, that the machine 10 shown in FIG. 3 illustrates an arrangement in which three tanks 90 containing different beverage liquids are being precooled, while six tanks 96 including three pairs thereof for three different beverage products are being maintained in cooled condition.

The illustrated arrangement of tanks 90 to be precooled upon the shelf 88 above the previously cooled tanks 96 upon bottom wall 60 of assembly 50 has been found convenient in servicing, in that, it is easy for a serviceman to lower the cooled tanks 90 into the lower part of the assembly 50 and onto the bottom wall 60 when needed as replacements for emptied tanks 96, and the lower disposition of the tanks in the vending circuit upon the bottom wall 60 also expedites the completion of necessary connections thereto of fluid carrying lines such as 110 and 112. However, it is to be understood that the invention contemplates as within its scope and as employing its advantages those alternate constructions in which the tanks 90 being precooled might be disposed below the tanks 96 in the vending circuit or in laterally rather than vertically displaced locations. An advantage is achieved by the illustrated arrangement, however, in that heat emanating from the tanks 90 being precooled and which are initially at ambient temperature when introduced into the machine 10 will flow directly upwardly into the evaporator 76 without contacting the previously cooled tanks 96.

Referring now to the diagrammatic arrangement of a hydraulic circuit as contemplated by the invention, the carbon dioxide tank 106 is provided at its outlet with a pressure regulating valve 114, as well as suitable gauges as at 116 for indicating the gas pressure being applied through line 110 to the space within a first precooled tank 96 above the surface 118 of beverage liquid in the latter. A connecting line 120 extends from a point within the last mentioned tank 96 below the surface of liquid 118 therein into communication with a second series product tank 96' above the surface level 118' of beverage liquid within the latter. A delivery pipe 122 extends from a point below the surface 118' of the liquid within the last of the series tanks 96' to a solenoid operated dispensing valve 124 provided with the spigot 30 and an electrically operating solenoid 126.

The simplicity of the gas and liquid circuit just described and the omission therefrom of any need for flash coolers, flow control regulators or the like will be apparent in view of the discussion above concerning the method contemplated by this invention. It may be noted, referring again to FIG. 3, that whenever one of the previously cooled products tanks 96 is exhausted of liquid, one of the tanks 90, after completion of precooling thereof, may be immediately substituted therefor. It is also noteworthy that the housing 12 and door 14, enclosing the compartment 44, provide a completely refrigerated space, which contains not only the product tanks 90 and 96 but also the carbon dioxide gas tank 106, which consequently also reaches a preferred, predetermined temperature shortly after installation thereof in the machine 10.

Without attempt to go into detail as to the possible alternatives available for the purpose of controlling the operation of the dispensing valve 124 through energization of the solenoid 126, there is illustrated in FIG. 4 one arrangement by which such function may be accomplished. The numerals 128 and 130 represent electrical power terminals, the latter of which is connected directly to the solenoid 126 through conducting means 132 and directly to one side of a timer motor 134 by electrically conductive means 136. The other power terminal 128 is coupled through conductive means 138 and a normally open switch 140 with the other side of the timer motor 134. The switch 140 is operably coupled as indicated at 142 with a coin deposit mechanism 144 adapted to close the switch 140 momentarily whenever proper coinage is deposited in the slot 16. Upon closure of the switch 140 the timer motor 134 is energized and commences to rotate a pair of associated cams 146 and 148. The cam 146 almost immediately upon energization of a cycle of the timer motor 134, permits the normally open switch 150 to close to complete a holding circuit in shunt with the switch 140. The cam 148 then closes a normally open switch 152 coupled in series between the power terminal 128 and the other side of the solenoid 126 by conductive means 154 and maintains such switch 152 closed for a predetermined period of time chosen to dispense a given volume of beverage during each vending cycle of the machine 10. When the predetermined period of dispensing time has elapsed the cam 148 permits the switch 152 to reopen, and the cam 146 then reopens the switch 150 to deenergize the timer motor 134 in position suitable for commencing another vending cycle when the coin switch 140 is again closed. Electrical means forming no part of the instant invention and, therefore, not illustrated, will conventionally be provided and operably coupled with the mentioned control circuit in such manner as to properly actuate the cup dispensing device 24 and perhaps other conventional, electrically responsive parts of the machine 10.

Although only a single product circuit is illustrated in FIG. 4, it will be understood by those skilled in the art that a single carbon dioxide gas tank 106 may be utilized with a plurality of product circuits as illustrated in FIG. 4, simply by providing parallel lines 110 and separate pressure regulating valves 114 for each such product circuit. Also, it will be understood that any desired number from one to about three or more tanks 96 may be included in each series product circuit. In the illustrated machine 10, three product circuits of two series product tanks each are contemplated for keeping and dispensing three different beverage products responsive to customer selection by operation of the appropriate one of product selector buttons 18.

Figure 8:
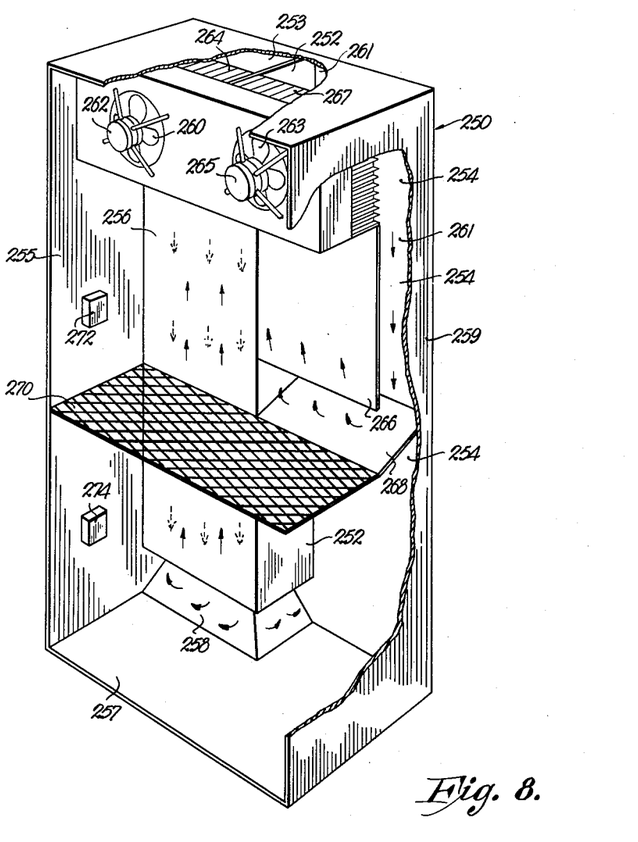
FIG. 8 is a more or less diagrammatic representation in perspective, with parts broken away for clarity of illustration, of another embodiment of apparatus embodying the principles of the invention.
Figure 9:
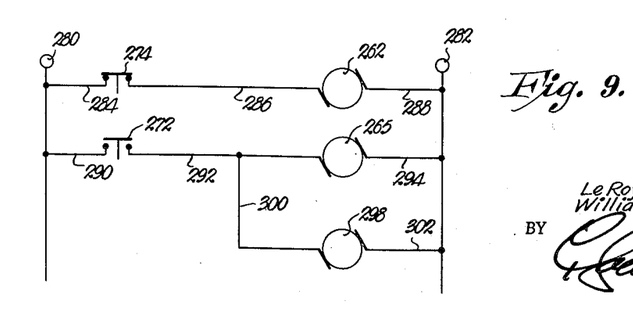
FIG. 9 is a schematic representation of electrical control circuitry which may be used in conjunction with the embodiment of FIG. 8.

Referring next to the embodiment illustrated in FIGS. 8 and 9, there is illustrated an assembly 250 generally corresponding in purpose to the assembly 50 just described and also adapted to be received within an insulated housing 12 having an insulated door 14. The assembly 250, however, is provided with a forwardly extending, upright dividing partition 252 extending forwardly from its rear wall 254 and enclosed at its forward extremity by a plate 256 to define a vertical duct 253 having its sole outlet at the open bottom thereof spaced above a deflector base 258. Such duct 253 defined by the partition 252, plate 256, rear wall 254 and side wall 255 is provided with a separate fan 260, fan operating motor 262 and evaporator 264 for circulating cooled currents of air downwardly through duct 253. It may be noted that duct 253 terminates adjacent the bottom wall 257 of the assembly 250. A second duct 261 is defined on the opposite side of partition 252 by the latter, the rear wall 254, the side wall 259 of assembly 250 and a front plate 266 terminating about halfway down the height of the assembly 250 above a deflector plate 268. A separate fan 263, fan operating motor 265 and evaporator section 267 is provided for cooling and circulating currents of air downwardly through the duct 261. A foraminous grill-like shelf 270 is provided in the assembly 250 for supporting tanks to be precooled, while previously precooled tanks may be supported beneath the shelf 270 upon the bottom wall 257.

In the embodiment of FIGS. 8 and 9, separate currents of cooled air are artificially provided and separately controlled for flow into the upper chamber above shelf 270 and the lower chamber below shelf 270. This results in separate control over the supply of cooled air to the tanks undergoing precooling and the previously cooled tanks which are merely being maintained at a predetermined temperature. Such control functions are accomplished by a first thermostatic switch 272 installed within the assembly 250 above the shelf 270 and a second thermostatic switch 274 installed in the assembly 250 below the shelf 270, in conjunction with the control circuitry illustrated in FIG. 9.

In FIG. 9, a pair of power terminals 280 and 282 adapted to be coupled with a source of electrical power have connected therebetween a series circuit including conductive means 284, thermostatic switch 274, conductive means 286, fan motor 262 associated with duct 253, and conductive means 288. Also coupled between the power terminals 280 and 282 is a second circuit including conductive means 290, thermostatic switch 272, conductive means 292, fan motor 265 associated with duct 261, and conductive means 294. As will be apparent to those skilled in the electrical arts, the thermostatic switch 274 will remain closed keeping the fan motor 262 energized to circulate cooled air through the duct 253 until the space below shelf 270 is cooled sufficiently to maintain previously cooled tanks in the assembly 250 beneath the shelf 270 in properly cooled condition. When sufficient cool air has been circulated through the duct 253 to bring the tanks within the chamber beneath the shelf 270 to the lower end of the desired temperature range thereof, the thermostatic switch 274 will open, de-energizing the fan 262 until the temperature of such tanks, and, therefore, that portion of the interior of the assembly 250 beneath the shelf 270 has risen to a level requiring further circulation of cooled air currents thereby.

It may be noted that air being circulated from the duct 253 finds a return path upwardly through the foraminous shelf 270 and around tanks resting upon the latter and being precooled, which tends to make double use of the cooled air currents from duct 253 since same are not normally appreciably warmed by passage around the previously cooled tanks in the portion of assembly 250 below the shelf 270. This is of particular aid when tanks at ambient temperature are initially emplaced within the assembly 250 upon the shelf 270 and all available cooling capacity is needed to quickly bring them to a lower temperature level.

Similarly, the motor 265 associated with fan 263 is controlled by the thermostatic switch 272 within the precooling chamber above the shelf 270, the switch 272 remaining closed until the temperature within such precooling chamber and, therefore, the temperature of the tanks being precooled, has been lowered to the desired level, whereupon the switch 272 will open until further cooled air currents are required to maintain such tanks in the precooling chamber above shelf 270 within the desired temperature range. Since the chamber for previously cooled tanks below the shelf 270 will normally reach a proper low temperature much more quickly than the precooling chamber above the shelf 270, and since it is desirable that when neither of the air circulating fans 260 and 263 are being operated power should be conserved by also cutting off the compressor of the refrigeration unit, a motor 296 operably coupled with such compressor for driving the same may conveniently be electrically connected in parallel with the motor 265 by conductive means 300 and 302.

A preferred range of operation for the thermostatic switches 272 and 274 has been found to be as follows: switch 272 opens at 28° F. and closes at 31° F., and switch 274 opens at 30° F. and closes at 33° F. Obviously, these operating temperatures may be altered slightly to meet individual operating requirements, but those mentioned have been found satisfactory for performing the method contemplated by this invention in apparatus of the type described.

Figure 10:
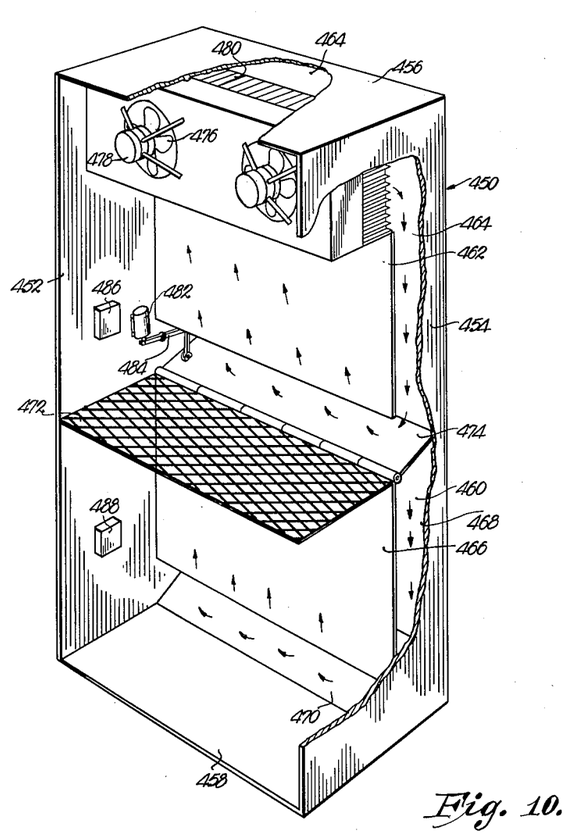
FIG. 10 is a more or less diagrammatic representation in perspective, with parts broken away for clarity of illustration, of another embodiment of apparatus embodying the principles of the invention.
Figure 11:
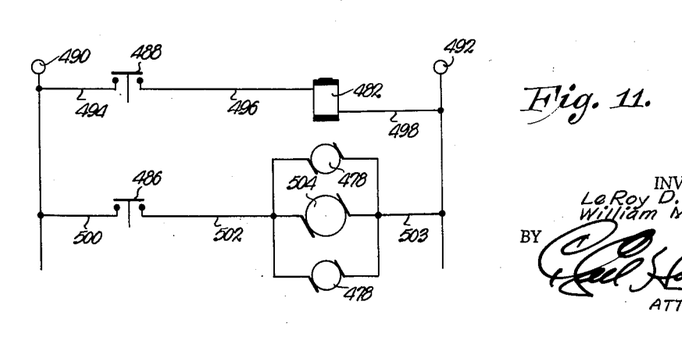
FIG. 11 is a schematic representation of electrical control circuitry which may be used in conjunction with the embodiment of FIG. 10.

Referring next to the embodiment of FIGS. 10 and 11, the frame and duct assembly is generally designated 450, and such assembly will be seen to include a pair of side walls 452 and 454, a top wall 456, a bottom wall 458 and a rear wall 460. Such assembly 450 is provided with an upper partition plate 462 spaced forwardly from the rear wall 460 to present an upper duct 464 therebetween extending laterally across the assembly 450. Spaced below the lowermost extremity of the plate 462 is a second partition 466 also spaced forwardly of the rear wall 460 to present a lower duct 468 therebetween. The lowermost extremity of the lower partition 466 is spaced above a deflector base 470 on the bottom wall 458 for discharging air currents flowing downwardly through the duct 468 into the lower portion of the assembly 450. A foraminous, grill-like shelf 472 extends forwardly from the upper extremity of the partition 466 and is adapted to receive and support thereon product tanks to be precooled, while previously cooled product tanks are emplaced in the lower portion of the assembly 450 upon the bottom wall 458. A damper plate 474 is pivotally mounted at the top of the lower partition 466 and extends generally rearwardly and upwardly therefrom at the zone of juncture of ducts 464 and 468. One or more fans 476, fan operating motor 478 and evaporator sections 480 are provided near the top of the assembly 450 for cooling and blowing currents of air downwardly through the upper duct 464.

Suitable control means such as an electrical solenoid 482 is mounted as on the side wall 452 and is operably coupled as by linkage means 484 with the damper plate 474 for swinging the latter about its axis of pivot between a pair of alternate positions in one of which the zone of communication between ducts 464 and 468 is virtually closed with the space below the lowermost extremity of partition 462 being open for discharge of cooled currents of air forwardly therefrom and an alternate position in which the damper plate 474 swings into closing relationship relative to the space between partitions 462 and 466 thereby opening the duct 464 into full communication with the lower duct 468. Obviously, with the damper plate 474 in the first-mentioned position, all of the cooled air flowing downwardly through duct 464 will be discharged into the upper part of the assembly 450 above the shelf 472 for cooling the product tanks resting on the shelf 472 and requiring precooling, while in the second-mentioned position of the damper plate 474 all of the cooled air flowing downwardly through duct 464 will pass into duct 468 and thence outwardly into the lower portion of the assembly 450 around the previously cooled product tanks, from whence it will then proceed upwardly through the foraminous shelf 472 and around the tanks being precooled. It is apparent, therefore, that this embodiment permits the utilization of the full cooling capacity of the air currents adapted either for concentrated cooling of the product tanks undergoing precooling or for use in cooling both the previously cooled tanks and those being precooled. Such function is controlled by a pair of thermostatic switches 486 and 488 and the control circuitry arrangement illustrated in FIG. 11.

Referring to FIG. 11, a pair of electrical power terminals are designated 490 and 492. Coupled between such power terminals 490 and 492 is a first circuit including conductive means 494, the thermostatic switch 488, conductive means 496, the solenoid 482 and conductive means 498. The thermostatic switch 488 will remain closed maintaining the damper plate 474 in its second position placing the ducts 464 and 468 in full communication with each other until the temperature in the lower portion of the assembly 450 has been lowered sufficiently to maintain the previously cooled tanks in properly cooled condition, the air currents thus circulated serving to effect some cooling action upon the tanks being precooled atop the shelf 472 (by virtue of the return path of such air currents). When the temperature within the lower portion of assembly 450 has been sufficiently lowered the thermostatic switch 488 will be operated to actuate the solenoid 482 to swing the damper plate 474 to its other position blocking the path of communication between the duct 464 and the duct 468, and the entire capacity of cooled air currents will then be discharged from beneath the partition 462 into the precooling area above the shelf 472.

Also coupled between the power terminals 490 and 492 is a second circuit including conductive means 500, the thermostatic switch 486, conductive means 502, the fan motors 478 arranged in shunt and conductive means 503. Thermostatic switch 486 remains closed to maintain the fan operating motors 478 energized until the temperature within the upper portion of assembly 450 has been sufficiently lowered, whereupon the thermostatic switch 486 will open to deenergize the fan motors 478. As a matter of convenience and power conservation, an operating motor 504 coupled with the compressor of the refrigeration unit may also be conveniently coupled in shunt with the fan operating motors 478, so that whenever the latter are not being utilized, the compressor will also be deactivated.

Suitable operating ranges for the thermostatic switches 486 and 488 are as follows: thermostatic switch 486 opens at 28° F. and closes at 31° F., while thermostatic switch 488 operates to actuate damper plate 474 into its duct separating position at 30° F. and operates to actuate damper plate 474 into its duct connecting position at 33° F.

If desired, the damper plate 474 may be so configured and arranged or the control elements 482 and 484 for such damper plate 474 so arranged as to move the damper plate 474 only between different intermediate positions never fully closing the communication between ducts 464 and 468 or between duct 464 and the zone of assembly 450 above the shelf 472, but rather merely varying the proportion of air currents being divided between such alternate paths.

A still further variation of the embodiment contemplated by FIGS. 10 and 11 involves the use of a control device as at 482 which is of nature adapted to vary the positioning of the damper plate 474 continuously in accordance with sensings of temperatures, thereby modulating the division of air currents between the two alternate paths in accordance with the temperature level prevailing within a particular portion of the interior of the assembly 450. For an example of such type of modulated damper apparatus which could be used or adapted for use in the connection mentioned, reference is made to U.S. Letters Patent Nos. 2,523,497, 2,523,498 and 2,523,499.

It is believed that a sufficient number of embodiments of apparatus have been disclosed not only to illustrate the means by which the method contemplated by the invention may be practiced but also to indicate the scope of novel improvements in apparatus for use in premix vending systems which are also contemplated by the invention.

It will be apparent from the foregoing disclosure that certain details of either the method or apparatus contemplated by the invention may be varied or modified to suit individual conditions or desires without departing from the true spirit of the invention. Accordingly, it is to be understood that the invention should be deemed as limited only to the fair scope of the appended claims.

Having thus described the invention, what is claimed as new and desired to be secured by Letters Patent is:

1. The method of dispensing maltless, nonalcoholic, carbonated beverage through an orifice of fixed size at a constant flow rate and with constant carbonation without the use of an inertia responsive, passage-restricting, liquid flow regulation step, which method comprises the steps of: enclosing a quantity of flowable, heat exchanging medium; refrigerating said heat exchanging medium; introducing into said refrigerated medium a confined quantity of maltless, nonalcoholic beverage liquid at a temperature above the temperature at which the beverage will be dispensed and containing in solution the same proportion of carbon dioxide gas as will be present when the beverage is dispensed; circulating said refrigerated medium in heat exchanging relationship with said confined quantity of liquid until said liquid is cooled to a preselected temperature within the range from 36° F. downwardly to just above the freezing point of said liquid; placing said cooled liquid in direct, pressurized communication with a confined quantity of carbon dioxide gas at a preselected pressure within the range from about 18 p.s.i.g. to 24 p.s.i.g.; maintaining both the pressure and the temperature of said liquid constant at said preselected respective levels thereof, while said liquid is within said refrigerated medium and in communication with said gas; then, at intermittent intervals, while so maintaining the pressure-temperature relationship in said liquid constant, placing said liquid in communication with the atmosphere for a predetermined period of time to dispense, at a constant rate of flow, a predetermined volume of said beverage at said constant, preselected temperature and carbonation, the magnitude of said volume, for an orifice of said size, being dependent solely upon and directly proportional to the duration of said period.

2. The method of claim 1, wherein said confined quantity of carbon dioxide gas is disposed within said circulating medium and is refrigerated to substantially the same temperature as said medium.

3. The method of dispensing maltless, nonalcoholic, carbonated beverage through an orifice of fixed size at a constant flow rate and with constant carbonation without the use of an inertia responsive, passage-restricting, liquid flow regulation step, which method comprises the steps of: enclosing a quantity of air; artificially refrigerating said enclosed air; artificially circulating said refrigerated air in two streams along respective paths, one of said streams including a major part of said refrigerated air and the other of said streams including the remaining minor part of said refrigerated air; introducing into said one circulating stream of refrigerated air a plurality of separately confined quantities of maltless, nonalcoholic beverage liquid each at a temperature above the temperature at which the beverage will be dispensed; successively moving said enclosed quantities of liquid into said other, circulating stream of refrigerated air after the same have respectively been cooled to a preselected temperature within the range from 36° F. downwardly to just above the freezing point of said liquid; placing at least one of said moved quantities of cooled liquid in direct, pressurized communication with a confined quantity of carbon dioxide gas at a preselected pressure within the range from about 18 p.s.i.g. to 24 p.s.i.g.; maintaining both the pressure and the temperature of said one moved quantity of liquid constant at said pre-selected respective levels thereof, while said one moved quantity of liquid is within said other circulating stream of refrigerated air and in communication with said gas; then, at intermittent intervals, while so maintaining the pressure-temperature relationship in said one moved quantity of liquid constant, placing said one moved quantity of liquid in communication with the atmosphere for a predetermined period of time to dispense, at a constant rate of flow, a predetermined volume of said beverage at said constant, preselected temperature and carbonation, said confined quantities of liquid being moved into said other circulating stream of refrigerated air and placed in communication with said gas as needed to replace previously moved quantities of liquid that have been dispensed.

4. The method as set forth in claim 3, wherein said paths of said one and said other streams of refrigerated air have respectively exclusive initial portions and a common return portion, said confined quantities of liquid being first introduced into said common return portion of said streams of refrigerated air, and said confined quantities of liquid being subsequently moved, after cooling thereof to said preselected temperature, into the exclusive initial portion of said other stream of refrigerated air.

References Cited in the file of this patent

UNITED STATES PATENTS

| | | |
|---|---|---|
| 1,922,995 | Wallach | Aug. 15, 1933 |
| 2,051,013 | Schulse | Aug. 11, 1936 |
| 2,074,365 | Clifford | Mar. 23, 1937 |
| 2,213,082 | Dale | Aug. 27, 1940 |
| 2,241,426 | Sherwood | May 13, 1941 |
| 2,322,625 | Geertz et al. | June 22, 1943 |
| 2,455,551 | Booth | Dec. 7, 1948 |
| 2,534,987 | Price | Dec. 19, 1950 |
| 2,633,959 | Von Stoeser | Apr. 7, 1953 |
| 2,648,274 | Bendfelt | Aug. 11, 1953 |
| 2,658,645 | Harris | Nov. 10, 1953 |
| 2,727,667 | Booth | Dec. 20, 1955 |
| 2,744,672 | Crist | May 8, 1956 |
| 2,746,641 | King | May 22, 1956 |
| 2,749,096 | Cole | June 5, 1956 |
| 2,750,076 | Welty et al. | June 12, 1956 |
| 2,767,960 | Fast | Oct. 23, 1956 |
| 2,772,812 | Booth | Dec. 4, 1956 |
| 2,834,190 | Andrews et al. | May 13, 1958 |
| 2,861,603 | Terlecki | Nov. 25, 1958 |